United States Patent
Morris et al.

(10) Patent No.: US 7,215,706 B2
(45) Date of Patent: May 8, 2007

(54) VIDEO SIGNAL ENCODING AND BUFFER MANAGEMENT

(75) Inventors: Octavius J. Morris, Redhill (GB); Wilhelmus H. A. Bruls, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 1233 days.

(21) Appl. No.: 09/855,115

(22) Filed: May 14, 2001

(65) Prior Publication Data

US 2002/0001344 A1     Jan. 3, 2002

(30) Foreign Application Priority Data

Jun. 1, 2000    (GB)  ................................. 0013273.8

(51) Int. Cl.
*H04N 7/12*      (2006.01)
(52) U.S. Cl. ................................. 375/240.01
(58) Field of Classification Search .............. 348/700, 348/701, 409, 416, 417, 419.1, 394.1, 401.1, 348/404, 400, 402.1, 413, 415, 425, 409.1; 375/240.01, 240.15, 240.05, 240.22, 240.03, 375/240.25, 240.12, 240.13; 382/236, 238; 386/112, 111, 126, 109, 124, 125
See application file for complete search history.

(56) References Cited

U.S. PATENT DOCUMENTS

| | | | |
|---|---|---|---|
| 5,929,911 A | 7/1999 | Cheney et al. ............. | 348/390 |
| 6,198,878 B1 * | 3/2001 | Blawat et al. ............. | 386/111 |
| 6,233,278 B1 * | 5/2001 | Dieterich ................. | 375/240.03 |
| 6,535,556 B1 * | 3/2003 | Kato et al. ............... | 375/240.05 |
| 6,665,872 B1 * | 12/2003 | Krishnamurthy et al. ..... | 725/95 |
| 2004/0076236 A1 * | 4/2004 | Duruoz et al. ............ | 375/240.25 |

FOREIGN PATENT DOCUMENTS

| | | |
|---|---|---|
| EP | 0720374 A1 | 12/1994 |
| EP | 0725538 | 8/1996 |
| EP | 0827344 | 3/1998 |
| WO | WO9617491 | 6/1996 |
| WO | WO0021302 | 9/1999 |
| WO | WO9959343 | 11/1999 |

OTHER PUBLICATIONS

JP-A-08 289 300 (abstract only); JP-A-09 1335 442 (abstract only).

* cited by examiner

*Primary Examiner*—Tung Vo
*Assistant Examiner*—Behrooz Senfi

(57) ABSTRACT

A method of, and apparatus for, encoding and multiplexing a digital video picture are provided using intra-coded fields only at a relatively high bit-rate, with each picture being encoded as a sequence of slices from the video image field. The encoding suitably complies with MPEG or similar requirements, and the intra-coding is further constrained so that the maximum number of bits for each slice in the picture is limited, and the delivery schedule of the bits to a decoder is more tightly constrained than is implied by the MPEG decoding models. In this way it is possible to build a high quality, low cost MPEG (or similar) encoder and decoder for video communications over digital interconnection standards such as IEEE 1394.

14 Claims, 4 Drawing Sheets

Figure 1:
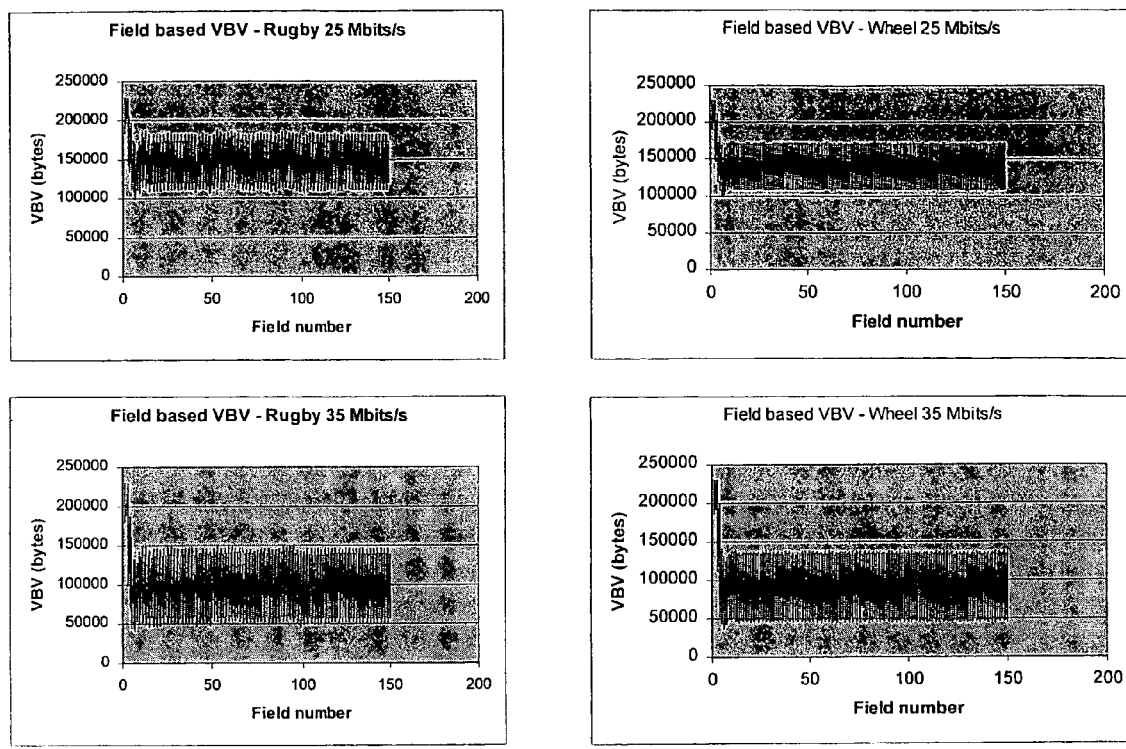

| Slice 1 |
| --- |
| Slice 2 |
| Slice 3 |
| Slice 4 |
| |
| Slice P |
| Slice P+1 |
| |
| Slice N |

VIDEO SIGNAL ENCODING AND BUFFER MANAGEMENT

The present invention relates to the coding of digital video signals and in particular to a method and apparatus for video coding for use in systems having constraints on the availability of memory for buffering.

One example of a coding system having constraints on buffering is described in our commonly-assigned International Patent Application WO 96/17491. This application describes a method and apparatus for encoding of digital video signals in the form of video clips to enable them to be seamlessly joined without requiring reset of a decoder to a starting state. The system uses an encoder having a coding stage and an encoder buffer, and the method comprises successively encoding the pictures of a clip according to a predetermined coding scheme (suitably according to MPEG standards), reading the encoded pictures into the buffer, and subsequently reading the encoded clip out of the buffer at a substantially constant bit rate. To enable simple joining of the clips, a predetermined encoder buffer occupancy is specified with a controllably varied target number of bits being used to encode a picture. The targeting produces an encoder buffer occupancy substantially equal to the predetermined buffer occupancy at the moment the last picture of the segment has been read into the buffer. Particular applications for the technique are in interactive video systems where the user can affect a narrative flow without having discontinuities in the presentation of that narrative.

Predetermined video coding schemes such as MPEG (as defined in ISO/IEC 11172 for MPEG-1 and ISO/IEC 13818 for MPEG-2 for example) are generic standards that are flexible and robust for many applications. Problems can arise, however, where processor capability for encoding and/or decoding of video is at a premium, and local memory is limited: in such circumstances, maintaining compliance with generic standards can become particularly difficult.

It is therefore an object of the present invention to minimise memory and processing resources with moderate video compression while retaining the capability for compliance with at least a sub-set of a coding specification, such as one of the MPEG standards.

In accordance with the present invention there is provided a method for encoding of a digital video image signal in an encoder apparatus having a coding stage and an encoder buffer, the method comprising the steps of:

successively encoding image fields of the signal in compliance with a predetermined coding scheme;

reading the encoded field data into the buffer; and subsequently reading the stored data out of the buffer at a bit rate determined at least partially by the fullness of the buffer;

wherein each image field is encoded as a series of slices each comprised of a predetermined number of successive lines of the field, with a predetermined number of data bits allocated for the encoding of a slice, and the encoded data for the slice is read into the encoder buffer and subsequently read out therefrom on completion of encoding of the slice.

By treating each field as a succession of slices of, for example, sixteen luminance or chrominance lines, the buffering requirements in the encoder are reduced as full-field buffering capacity is not required. Sequentially coding each slice with reference to the predetermined coding scheme thus enables compliance with reduced memory requirements.

Suitably, the slices of a field are encoded such that the encoded field complies with one or more MPEG standards and, to further reduce buffering requirements, the slices of a field are preferably intra-coded without reference to any other field.

As one technique for keeping within the predetermined number of bits for encoding a slice, the coding stage is suitably operable to encode the slice at a number of quantisation levels (i.e. levels of detail), and the quantisation level used is chosen in dependence on the said predetermined number of bits allocated. The level of detail may be chosen adaptively to maximise the resolution given the maximum number of bits available, although this is more computationally expensive than working with a finite group of predetermined quantisation levels.

Also in accordance with the present invention there is provided a digital video image signal encoder apparatus comprising:

an encoding stage arranged to receive successive image fields of the signal and encode them according to a predetermined coding scheme; and a buffer coupled to receive encoded field data from the encoding stage and arranged to subsequently output the stored data at a bit rate determined at least partially by the fullness of the buffer;

wherein the encoding stage is further arranged to encode each image field as a series of slices each comprised of a predetermined number of successive lines of the field and within a predetermined number of data bits allocated for the encoding of a slice, and the buffer is arranged such that the encoded data for the slice is read in thereto and subsequently read out therefrom on completion of encoding of the slice.

As with the previously described method, the encoding stage may suitably be arranged to encode the slices of a field such that the encoded field complies with one or more MPEG standards, optionally with the encoding stage arranged to intra-code the slices of a field without reference to any other field. Further, the encoding stage may be operable to encode a slice at a number of quantisation levels, and the quantisation level used is suitably determined within the stage in dependence on the said predetermined number of bits allocated.

An apparatus as described above has a number of applications, not least as a conversion utility for taking existing coded digital video and re-coding it (still maintaining compliance with the predetermined coding standard) to meet tighter requirements on buffering and bandwidth. Therefore, in accordance with a further aspect of the present invention there is provided a digital video image processing means comprising a signal encoding apparatus as described above and further comprising a source of encoded digital video images coupled with a decoder for said encoded images, said decoder having an output coupled as input for said encoding stage.

In one embodiment, the aforementioned source of encoded digital video images may comprise connection means for coupling to a remote source of said images. Alternately, the said source may comprise means for receiving and reading encoded digital video image data from a removable storage device. In this latter case, the removable storage suitably device comprises an optical disc formatted according to DVD, CD-ROM or similar standards, and the means for receiving and reading encoded digital video image data is a suitably configured disc reader.

Still further in accordance with the present invention there is provided an optical disc carrying a plurality of video image fields encoded by the method recited previously.

Figure 2:
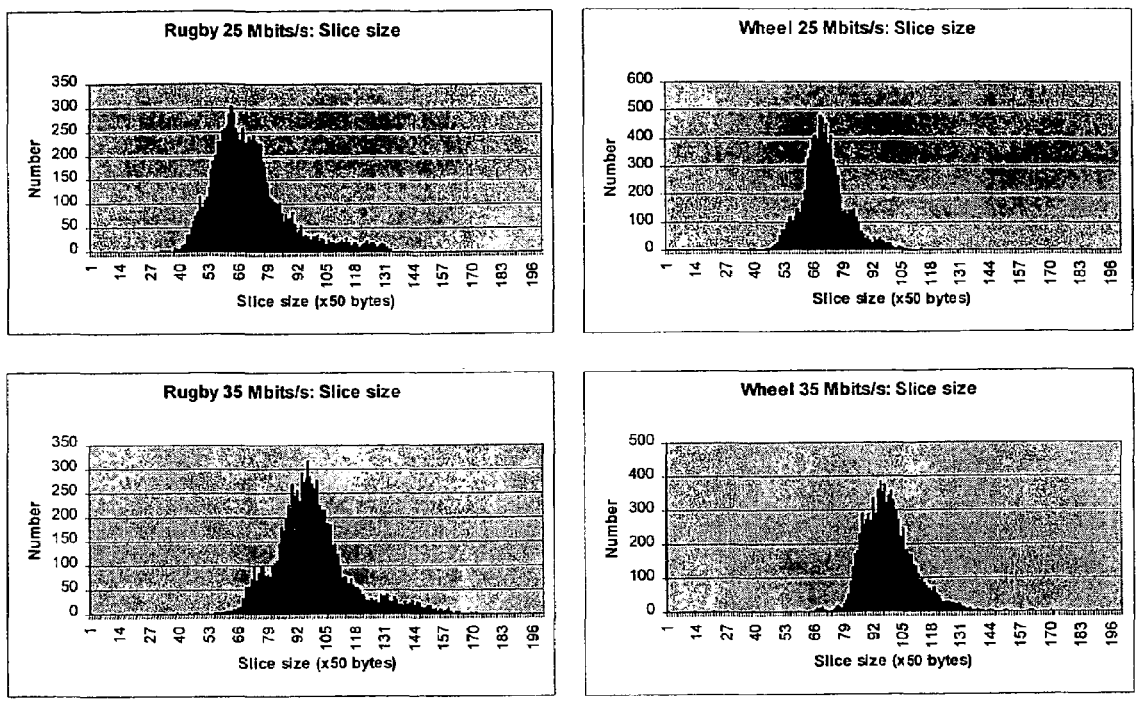
Figures 3, 4:
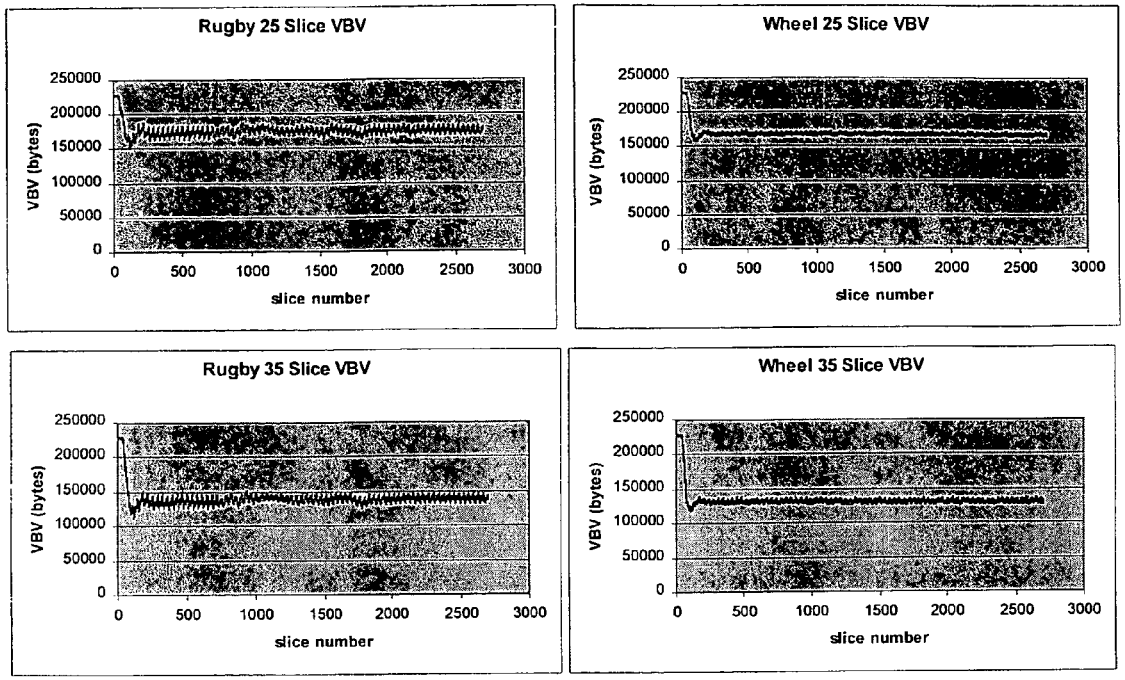
Figure 5:
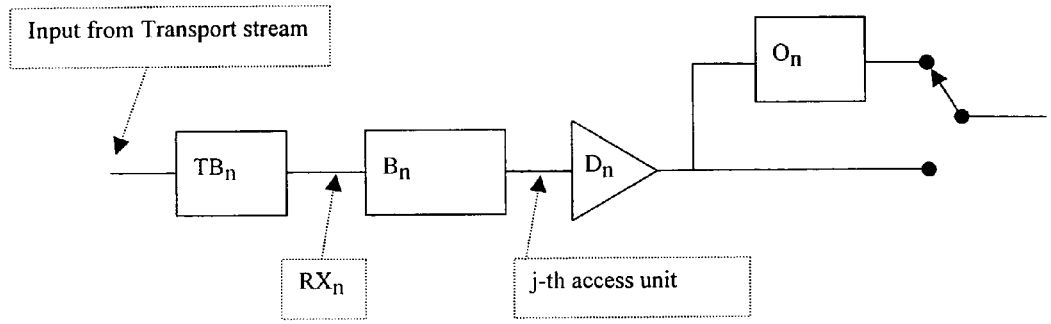
Figure 6:
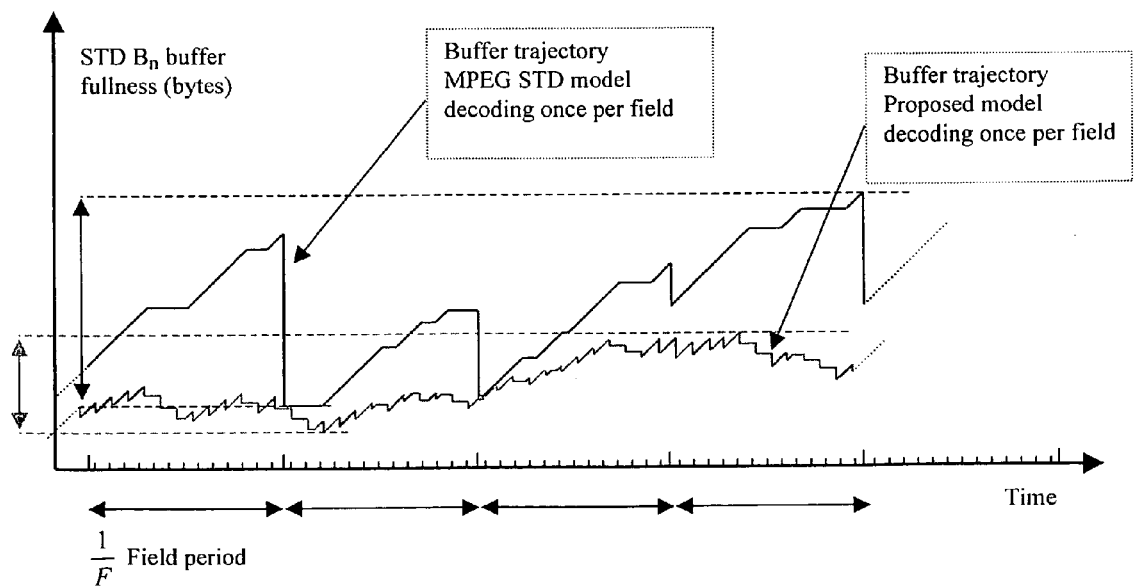

Preferred embodiments of the invention will now be described by way of example only, and with reference to the accompanying drawings in which:

FIG. 1 shows plots of the MPEG VBV buffer status for two sequences coded as full frames at two bit-rates and in intra-field mode;

FIG. 2 comprises respective histograms of slice size for the sequences and bit-rates of FIG. 1;

FIG. 3 shows plots of the MPEG VBV buffer status corresponding to those of FIG. 1 but coded as slices;

FIG. 4 schematically represents a restricted slice structure conforming to MPEG-2 requirements;

FIG. 5 is a functional representation of components of the modified MPEG buffer model; and FIG. 6 is a comparative graph of buffer fullness against time for the full-field and separate slice coding schemes.

The following description considers video coders operating according to the MPEG standards (including ISO 11172-2 for MPEG-1 and in particular ISO 13818-2 for MPEG-2) although the skilled practitioner will recognise the applicability of the present invention to other video coding schemes not in conformance with the MPEG standard.

In the following coding scheme, only intra-field based coding is used with each field being coded without reference to any other. In this way, the amount of memory required is minimised as there is no requirement for the full field buffers needed by predictive (MPEG P- and B-type) coding. The coding scheme includes a number of restrictions on the MPEG-video (ISO/IEC 13818-2) video format: all restrictions defined in ISO/IEC 13818 for Main Profile bit-streams apply, as well as a number of further constraints, as follows.

In the Sequence Header:
horizontal_size_value shall be 720
vertical_size_value shall be 480 if frame_rate is 0100b (29.97 Hz), or 576 if
frame_rate_code is 0011b (25 Hz).
frame_rate_code shall be 0100b or 0011b.
bit_rate shall be less than 75000 (30 Mbits/s).
vbv_buffer_size_value shall be 112 or less. The actual buffer size is vbv_buffer_size_value×16×1024 bits, which corresponds to the 1 835 008 bits specified for MP@ML in ISO/IEC 13818-2. It will be noted that the MPEG buffer size is defined for a generic MPEG encoder and multiplexer, although in the preferred embodiment we use intra-field coding at a high bit-rate. There is much less variability in the amount of data generated by an MPEG encoder for this profile than in a generic I-, B-, P-frame MPEG encoder that has to optimise the bit-rate to the greatest extent possible. Applicants have recognised that this enables a reduction of the buffer size considerably for this profile by further constraining the VBV and STD models.

In the Sequence Extension:
profile_and_level_indication shall be 01000110b (meaning MP@High-1440).
progressive_sequence shall be '0'
chroma_format shall be 01b (4:2:0).
horizontal_size_extension shall be 00b.
vertical_size_extension shall be 00b.
bit_rate_extension shall be 00000000b
frame_rate_extensions shall be set to '0'

The Sequence Display Extension and Sequence Scalable Extension are not used. The Group of Pictures (GOP) header should be encoded at least every 12 frames (25 Hz frame rate), or 15 frames (29.97 Hz frame rate), and should be preceded by a repeated sequence_header and sequence_extension.

In the Picture Header:
picture_coding_type shall be 001b (to specify Intra coded).
vbv_delay shall be 0xffff.

In the Picture Coding Extension:
picture_structure shall be set to 01b (Top Field) or 10b (Bottom Field), alternating as defined in ISO/IEC 13818-2. Frame pictures are not permitted.

Considering now the buffering requirements: intra-field-based coding, as defined above, is used to minimise the amount of memory needed for encoding and decoding processing. To reach an overall optimisation of the memory required, consideration is also made of the buffering memory needed for the VBV and multiplexing. The following section considers both the amount of memory needed to store the input signal while its is being encoded (or decoded), and the amount of VBV buffer that is needed.

Looking first at issues of input buffering for field-based coding, DVD (Digital Versatile Disc) sub-pictures are 4:2:2 resolution. The following assumes that the mixing between sub-pictures and MPEG video is done after upsampling the MPEG 4:2:0 video to 4:2:2 and hence that the video input to the re-encoder is in a field sequential 4:2:2 format and the colour will need to be down-sampled.

In a preferred embodiment, we implement a field based encoder with 16-lines of video storage for the luminance and 16-lines for the chrominance at the input of the encoder. The skilled practitioner will recognise that these figures depend on details of the encoder and that it is possible to use a little less memory, especially if the input is already in 4:2:0 format. As an alternative, a further solution is to use a little more memory. In terms of the storage requirements for the 16-line slice embodiment::
  16-lines of video storage requires 16*720=11520 bytes for luminance
  16 lines 16*720=11520 bytes for chrominance
  Total requirement=23 kBytes Conventional frame-based coding on the other hand requires a field-store of memory and further storage for at least the first 8-lines of the second field. For 625-line signals the storage requirements are as below; for 525-line systems slightly less memory is needed.
  288+8 lines of video storage requires (288+8)*720=213120 bytes for the luminance
  144+4 lines (144+4)*720=106560 bytes for the chrominance
  Total requirement=320 kBytes Considering next the memory needed for VBV and STD buffers, the main considerations are the bit-rate of the streams and the size of the pictures. Assuming, for example, 30 Mbits/s and full-screen 625 or 525-line pictures gives the following figures:

| Field rate | 50 Hz | 60 Hz |
|---|---|---|
| Bit-rate | 30 Mbits/s | 30 Mbits/s |
| Bits/field | 600 kbits | 500 kbits |
| Bits/pixel | 2.9 bits/pixel | 2.9 bits/pixel |

In terms of picture size, the above-mentioned figure of 2.9 bits/pixel results in a relatively high bit-rate. However, applicants have recognised that it is not often necessary to exceed this bit-rate, even for short periods of time, to have good picture quality and hence low variability in the number of bits/picture that the MPEG encoder needs to produce may be expected. This is especially true as only one picture type is used, namely I-frames, unlike the case of I-, B-, and P-frame encoding in a full MPEG system. Consequently, it is seen that relatively little buffering is needed to absorb the short-term variations in the bit-rate.

Turning now to considerations of bit-rate, the amount of VBV buffering needed also depends on the bit-rate and the expected size of so-called "access units" (namely compressed MPEG fields). From the above list of field values at 50 Hz and 60 Hz, the average size is about 600 kbits at 50 Hz. In the MPEG model, the buffer size has to be at least bigger than this. However, given the conclusion from section 0 it does need to be greatly bigger than this. Also, the MPEG MP@ML buffer sizes are more than adequate for this profile of signals despite the higher bit-rate than is allowed in MP@ML.

To illustrate the above conclusions, applicants have encoded two sequences (identified in FIGS. 1 to 3 as "Rugby" and "Wheel" respectively) in intra-field mode at two different bit-rates (25 Mbit/s and 35 Mbit/s) to investigate the actual evolution of the VBV buffer status. No special encoding control algorithms were used to minimise the buffer occupancy. This provides a simple check on the conclusions above.

FIG. 1 provides plots of the MPEG VBV buffer status for the two sequences coded at the two bit-rates in intra field mode. The plots show that the normal MP@ML buffer is adequate for field based intra coding. The transient seen at the start (left hand edge of the trace) is a consequence of the encoder starting with an empty buffer. This is easily solved with a more sophisticated controller. The plots of FIG. 1 also confirm that the picture size is generally consistent in this kind of high bit-rate encoding, and backs the applicants assertion that a smaller buffer could be used without having an impact on picture quality: in particular, the MPEG MP@ML buffer size of 230 kbytes is suggested as big enough for this application although, as will be seen below, a reduction in this is aimed for.

Adopting the VBV and STD models defined in ISO/IEC 13818-1 gives great freedom to design different scheduling algorithms for multiplexers, and control algorithms for video encoders. However, they do not deliver the smallest memory usage possible and, at minimum, a reduction in the amount of buffer memory needed, while maintaining full bits-stream compatibility with MPEG is aimed for.

As noted above, the prior art MPEG model examines the VBV at the end of each picture (in this case field) period. This means that the absolute minimum buffer size usable would be the worst case coded field size that may be expected. The average size at 30 Mbits/s is 600 kbits, and with operational tolerances, a working application would require in excess of that.

The applicants have recognised that a buffer model which examines the input buffer much more frequently than once per field, for example once each slice of the picture, enables the use of a smaller buffer. In support of this, constraints on the encoding and multiplexing guarantee that the data for decoding each slice is available in the buffer at the end of the slice period rather than at the end of the field period. This limits to some extent (determined by the size of buffer chosen) the freedom of the encoder to redistribute bits to different parts of the picture. In practice, because a high bit-rate intra encoder is used, this is likely to acceptable for the picture quality. This also limits the freedom of the multiplexer to deliver the data in a very bursty fashion.

Again because this is a very simple multiplex with one video stream and one or two audio streams, this is viewed as acceptable.

In terms of the distribution of bits within a field, to have some idea of how much can be saved by this approach, the same two sequences as were used in the experiments above (and illustrated in FIG. 1) are utilised below, assuming a slice-based VBV model.

Firstly, a histogram is plotted of the size of the slices in the sequences (as shown in FIG. 2): this figure shows that the slices vary in size up to about twice the average size (at 30 Mbits/s the average size of a slice in 625-line signal is about 4 kbytes). This implies that the absolute minimum size of buffer needed would be at least 2 or 3 times the average size. That would make it about 12 kbytes. However, 12 kbytes is very unlikely to be enough: a sequence of slices that are above average in size will cause difficulties, and there is a need to be able to support having four or five slices in sequence that are all at double the average size. This implies a required buffer size greater than the size of the largest slice to give some short term integration of the bits that are generated. To illustrate this further, the same two sequences as before were taken and the VBV model replotted, with the results of this shown in FIG. 3.

As before, there is a starting transient that can easily be removed by having a better encoder control algorithm that is aware of the new buffer model, but now the buffer stays in a much smaller dynamic range than the field-based model. This dynamic range is between 130 kbits and 200 kbits. As will be appreciated, this is a sequence that was encoded without knowledge of the slice-based model. It was encoded to meet the constraints of the full (i.e. full-field) MPEG model. Therefore the per-slice model can be buffered in a much smaller buffer with no loss of picture quality. Accordingly, a slice based model is believed able to offer equivalent picture quality to the field based model with a buffer size of about 200 kbits (25 kbytes). With suitable control algorithms, this size of buffer should be guaranteed, and it might be possible to reduce the buffer further, with minimal impact on picture quality.

Considering next the slice-based VBV and STD buffering, the basic idea is to limit the maximum number of bits used to code each slice, and to change the period at which data is removed from the STD buffers from once per access unit (field) to once per slice. This restricts the amount of multiplex "jitter" and makes sure that the data for each slice is delivered just in time. This allows the use of a significantly smaller buffer in the STD model while remaining a sub-set of the MPEG buffer model. This means that practical decoders can either be normal, fully compliant MPEG decoders, or can be customised devices that can be made with much smaller memory requirements.

FIG. 4 shows the restricted slice structure defined in ISO/IEC 13818-2. Each field consists of N-slices of 16-luminance lines each. In the case of the 625-line 50 Hz system N is 18 slices/field. In the case of the 525-line 59.94 Hz system N is 15 slices/field. In the following:

N=slices/field
R=the bit-rate
F=the field rate
B=buffer size
TB=transport buffer size
bits(i)=number of bits in the $i^{th}$ slice of the field
DTS=decode time of the field The following description also refers to FIG. 5 which gives a diagram of the modified buffer model. In this model, complete transport stream packets containing data for video stream n enter the $TB_n$ buffer of the STD model from the transport stream at a piecewise constant rate, as defined in section 2.4.2.2 in ISO/IEC 13818-1. Bytes are removed from the $TB_n$ buffer at the rate $RX_n$ as defined in section 2.4.2.3 in ISO/IEC 13818-1.

The value of $Rx_n$ is:

$Rx_n=0$ when there is no data in $TB_n$ $Rx_n=1.2\times30=36$ Mbits/s when there is data in $TB_n$ Bytes that are part of a PES packet or its contents are delivered to buffer $B_n$ in the way defined in section 2.4.3.2 in ISO/IEC 13818-1, although it should be noted that $B_n$ in this model is the combination of the buffers $MBS_n$ and $EB_n$ that are defined in ISO/IEC 13818-1, namely:

$$B_n = MBS_n + EB_n$$

In terms of removal of data, the bits needed to decode the i-th slice of the j-th field, $bits_i(j)$, are removed instantaneously from the buffer B at time $t_i$ given by:

$$t_i^j = td_n(j) + \frac{1}{F}\left(\frac{i}{N} - 1\right)$$

Where

N Is the number of slices in the field.

i Is the number of the slice in the field in the range [1 ... N].

$t_i^j$ Is the removal time of the i-th slice of field j.

$td_n(j)$ Is the decoding time of the j-th field. It is identical to the value defined in section 2.4.2.3 of ISO/IEC 13818-1. It is equal to or derived from the DTS value.

F Is the field rate of the sequence (59.94 Hz or 50 Hz).

For picture reordering, since the sequence is known to consist entirely of I-fields, there is no need to have a picture reordering delay. Thus the PTS and DTS of the field shall be encoded with identical values. A further requirement is that the Transport Stream shall be constructed so that:

$TB_n$ shall not overflow and shall empty at least once every second.

$B_n$ shall not overflow and shall not underflow.

The delay of data through the STD shall be less than 1 second.

Considering buffer size, $TB_n$ is suitably 512 bytes, with $B_n$ being $20.10^3$ bytes, leading to the example of FIG. 6 where the behaviour of the MPEG and the proposed buffer model respectively are illustrated. The Figure illustrates how using a buffer model that is examined more frequently constrains the multiplex so that less buffering is needed. The maximum distance between the peak and troughs of these curves is the maximum amount of buffer required to avoid under/overflow.

In the foregoing we have described a method of, and apparatus for, encoding and multiplexing a digital video picture are provided using intra-coded fields only at a relatively high bit-rate, with each picture being encoded as a sequence of slices from the video image field. The encoding suitably complies with MPEG or similar requirements, and the intra-coding is further constrained so that the maximum number of bits for each slice in the picture is limited, and the delivery schedule of the bits to a decoder is more tightly constrained than is implied by the MPEG decoding models. In this way it is possible to build a high quality, low cost MPEG (or similar) encoder and decoder for video communications over digital interconnection standards such as IEEE 1394.

From reading the present disclosure, other variations will be apparent to persons skilled in the art. Such variations may involve other features which are already known in the methods and apparatuses for editing of audio and/or video signals and component parts thereof and which may be used instead of or in addition to features already described herein.

The invention claimed is:

1. A method for encoding of a digital video image signal in an encoder apparatus having a coding stage and an encoder buffer, the method comprising the steps of:

successively encoding image fields of the signal in compliance with a predetermined coding scheme; reading the encoded field data into the buffer; and subsequently reading the stored data out of the buffer at a bit rate determined at least partially by the fullness of the buffer; wherein each image field is encoded as a series of slices each comprised of a predetermined number of successive lines of the field, with a predetermined number of data bits allocated for the encoding of a slice, and the encoded data for the slice is read into the encoder buffer and subsequently read out therefrom on completion of encoding of the slice.

2. A method as claimed in claim 1, in which the slices of a field are encoded such that the encoded field complies with one or more MPEG standards.

3. A method as claimed in claim 2, in which the slices of a field are intra-coded without reference to any other field.

4. A method as claimed in claim 1, wherein the coding stage is operable to encode a slice at a number of quantisation levels, and the quantisation level used is chosen in dependence on the said predetermined number of bits allocated.

5. A method as claimed in claim 1, wherein each slice comprises sixteen luminance lines.

6. A digital video image signal encoder apparatus comprising: an encoding stage arranged to receive successive image fields of the signal and encode them according to a predetermined coding scheme; and a buffer coupled to receive encoded field data from the encoding stage and arranged to subsequently output the stored data at a bit rate determined at least partially by the fullness of the buffer; wherein the encoding stage is further arranged to encode each image field as a series of slices each comprised of a predetermined number of successive lines of the field and within a predetermined number of data bits allocated for the encoding of a slice, and the buffer is arranged such that the encoded data for the slice is read in thereto and subsequently read out therefrom on completion of encoding of the slice.

7. Apparatus as claimed in claim 6, wherein the encoding stage is arranged to encode the slices of a field such that the encoded field complies with one or more MPEG standards.

8. Apparatus as claimed in claim 7, wherein the encoding stage is arranged to intra-code the slices of a field without reference to any other field.

9. Apparatus as claimed in claim 6, wherein the encoding stage is operable to encode a slice at a number of quantisation levels, and the quantisation level used is determined within the stage in dependence on the said predetermined number of bits allocated.

10. A digital video image processing means comprising an apparatus as claimed in claim 6, further comprising a source of encoded digital video images coupled with a decoder for said encoded images, said decoder having an output coupled as input for said encoding stage.

11. Processing apparatus as claimed in claim 10, wherein said source of encoded digital video images comprises connection means for coupling to a remote source of said images.

12. Processing apparatus as claimed in claim 10, wherein said source of encoded digital video images comprises means for receiving and reading encoded digital video image data from a removable storage device.

13. Processing apparatus as claimed in claim 12, wherein the means for receiving and reading encoded digital video image data from a removable storage device comprises an optical disc reader.

14. An optical disc carrying a plurality of video image fields encoded by the method of claim 1.

* * * * *